United States Patent [19]
Vetter

[11] 4,087,110
[45] May 2, 1978

[54] WINDSHIELD ASSEMBLY

[75] Inventor: Craig W. Vetter, Rantoul, Ill.

[73] Assignee: Vetter Design Works, Inc., San Luis Obispo, Calif.

[21] Appl. No.: 769,579

[22] Filed: Feb. 17, 1977

Related U.S. Application Data

[63] Continuation-in-part of Ser. No. 639,998, Dec. 12, 1975, abandoned.

[51] Int. Cl.² .............................................. B62J 17/00
[52] U.S. Cl. .................................. 280/289 S; 296/78.1
[58] Field of Search ................. 296/78.1, 84 A, 84 H, 296/84 K, 84 N, 98 R, 66, 89, 20, 92, 87, 76; 180/5 R; 280/289 S; 248/316 D; 24/201 S, 230 F

[56] References Cited

U.S. PATENT DOCUMENTS

| 2,352,727 | 7/1944 | McMahon | 296/84 R |
| 3,081,127 | 3/1963 | Orowan | 296/84 R |
| 3,350,045 | 10/1967 | Mayers | 248/316 D |
| 3,627,248 | 12/1971 | Nelson | 24/201 S |
| 3,819,226 | 6/1974 | Sykora | 180/5 R |
| 3,891,265 | 6/1975 | Blackburn | 296/78.1 |

FOREIGN PATENT DOCUMENTS

| 221,326 | 9/1924 | United Kingdom | 296/78.1 |

Primary Examiner—Robert R. Song
Attorney, Agent, or Firm—Wegner, Stellman, McCord, Wiles & Wood

[57] ABSTRACT

A windshield is either pivotally mounted or breakaway mounted along its bottom edge to a motorcycle fairing and releasably held in an upright position by means along sides of the windshield which allow the windshield to separate therefrom and either pivot forward or fly away from the rider upon the rider striking the windshield. In one embodiment, the windshield is held by bendable U-shaped clips, and the release of the windshield is achieved partly through flexing of the windshield and partly through the bending of the clips. In another embodiment, a resilient windshield is held between a pair of rigid U-shaped brackets in a flexed state, and release of the windshield upon impact is achieved solely through the flexing of the windshield.

13 Claims, 15 Drawing Figures

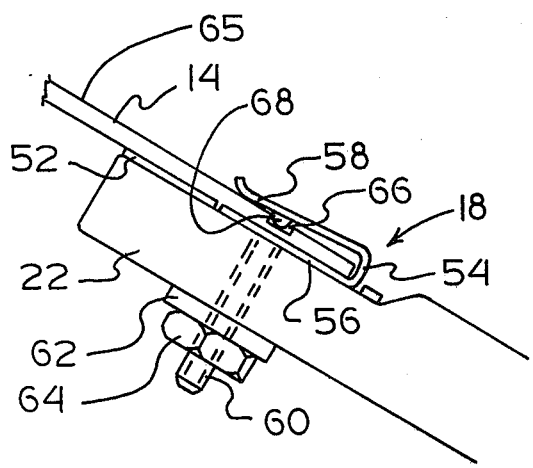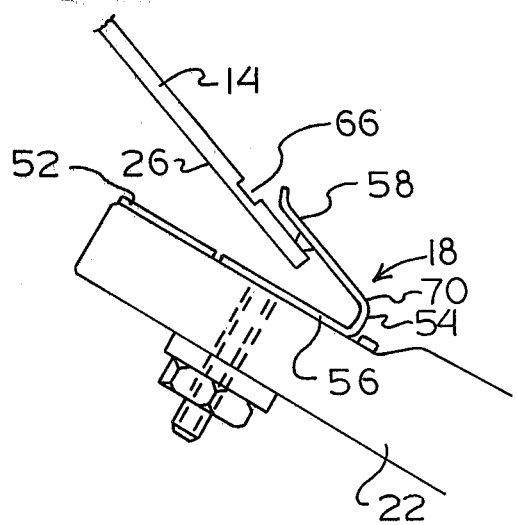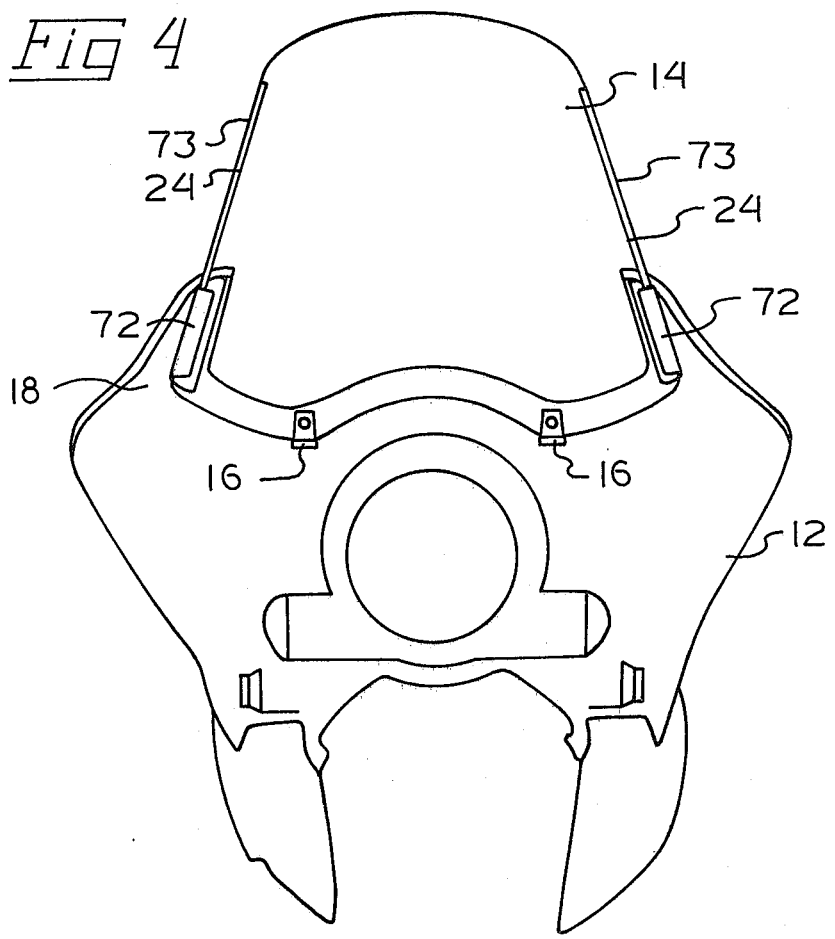

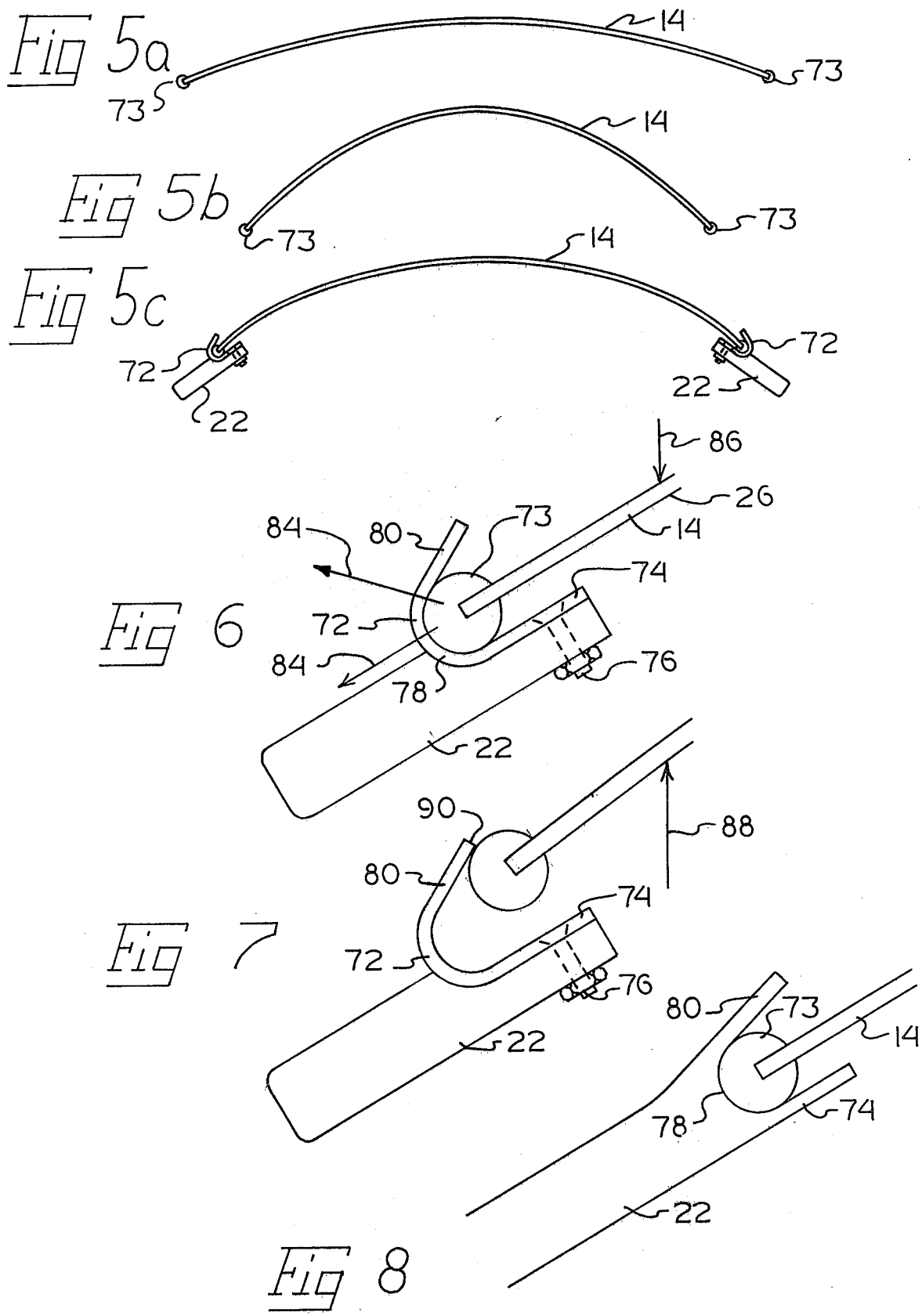

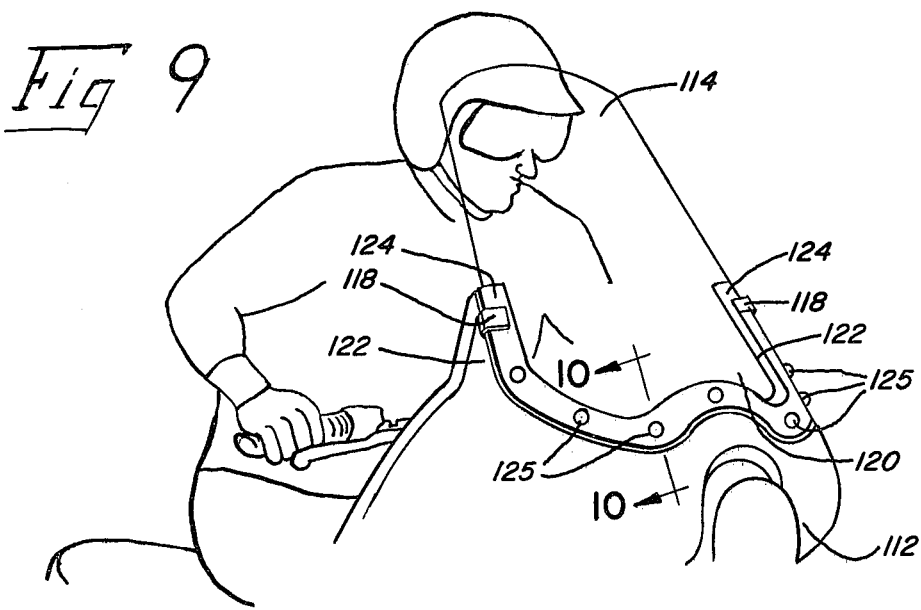
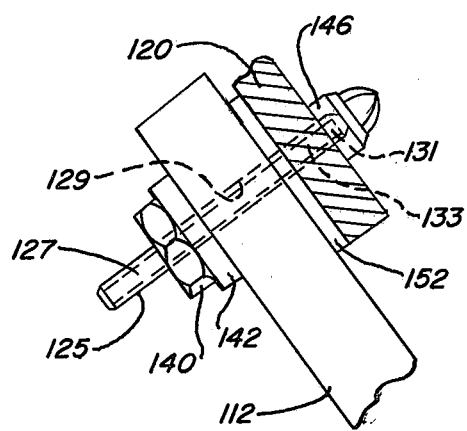
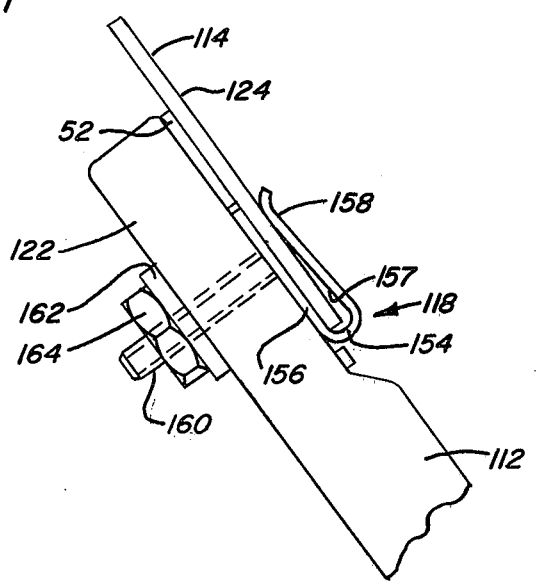
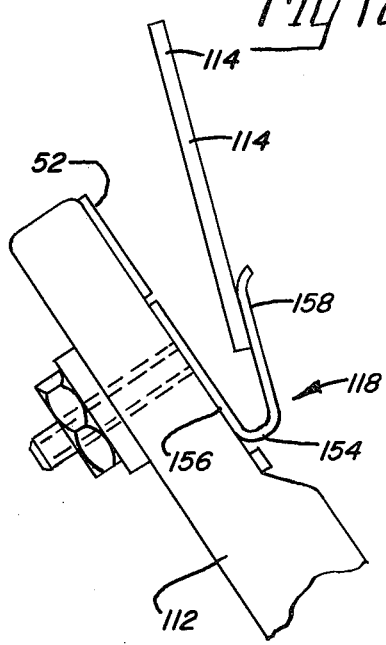

WINDSHIELD ASSEMBLY

This application is a Continuation-in-Part Application of application Ser. No. 639,998 filed Dec. 12, 1975, now abandoned.

BACKGROUND OF THE INVENTION

1. Field of the Invention

This invention relates to a windshield mounting assembly which releases the windshield when it is struck with a predetermined force and, more particularly, to such an assembly in which the windshield is either hingedly mounted or breakaway mounted to a vehicle.

2. Description of the Prior Art

Riders of vehicles with windshields have been injured when thrown against the windshields upon an abrupt stop of the vehicle, as in an accident. To minimize such injury, windshield assemblies have been proposed in which the windshield is held in an upright, operative position by means which allow the windshield to move forwardly upon receiving an impact force from behind of sufficient magnitude.

For example, in U.S. Pat. No. 2,352,727 issued July 4, 1944 to McMahon, an automobile windshield is yieldably held against a seat along the periphery of a windshield opening by four spring-biased rollers overlying the front surface of the windshield. Upon impact, the rollers are caused to pivotally spring away from the windshield which is thereby allowed to fly forwardly and completely separate from the automobile.

In British Pat. No. 221,326 issued Sept. 11, 1924 to Auster Limited, a windshield is pivotally mounted to the handlebars of a motorcycle by hinges which hold the windshield in an upright operative position by spring pressure or the like until the spring pressure is overcome by impact force against the rear of the windshield. The spring pressure force must also be relied on to prevent the windshield from pivoting backward and striking the rider in the event of an impact force applied to the front of the windshield.

A windshield assembly is shown in the U.S. Pat. No. 3,819,226 of Sykora, issued June 25, 1974 to The Coleman Company, Inc., in which a windshield is secured to the body of a snowmobile by a plurality of lugs selectively weakened to permit the windshield to break away from the snowmobile upon impact. As in the assembly of McMahon, the entire windshield is permitted to separate from the vehicle.

A windshield assembly which overcomes problems associated with complete separation of the windshield from the vehicle upon impact, but does so at the expense of complication, is shown in U.S. Pat. No. 3,081,127 issued March 12, 1963 to Orowan. There, a rigid windshield is pivotally mounted along the bottom edge thereof to an automobile adjacent the windshield opening and resiliently held against a seat at the top edge of the opening by a coil spring member secured to the top of the automobile.

SUMMARY OF THE INVENTION

An object of the present invention is to provide a windshield assembly having a windshield releasably mounted to a vehicle in an upright, operative position by simple and inexpensive, but effective, releasable mounting means which will allow the windshield to separate therefrom upon receiving an impact force on its leeward side, but which will secuurely hold the windshield in the operative position against vibrations, wind force and impact force applied to the front of the windshield.

Three embodiments are provided in accordance with these objectives. In two of the embodiments, a hinged windshield is releasably held by means secured to the vehicle at opposite side edges of the windshield such that the windshield, upon receiving an impact force of predetermined magnitude, separates from the releasable holding means. Upon being released, the windshield pivots forwardly away from a passenger striking the windshield and downwardly against the front of the vehicle. The hinges minimize the dangers arising from the windshield being thrown from the vehicle and also minimize damage to the windshield. The release of the windshield is effected with minimum, if any, damage to the releasable holding means, and if the windshield itself is not damaged, it may be simply pivoted back to, and secured in the operative position. In one of the two embodiments with the hinged windshield assembly, the side edges of the windshield are held between a pair of U-shaped bendable clips with one arm thereof overlying the front surface of the windshield. The overlying arms are bent away from the windshield by the impact force transmitted therethrough to release the windshield.

An advantageous feature of this embodiment of the windshield assembly is that a flexible windshield is employed, and the restraint of the arms against forward movement of the side edges thereof causes them to slidably flex away from the overlying arms upon impact. This minimizes the necessary amount of bending for release of the windshield and thus minimizes fatigue damage to the clip.

In the other of the two embodiments with the hinged windshield assembly, the side edges of a hingedly mounted resilient windshield are held between a pair of relatively rigid U-shaped brackets and release therefrom is effected solely by the flexing action of the windshield. An arm of each bracket overlying the windshield is slanted forwardly away from the windshield to minimize the amount of windshield flexing needed for release. When in the operative position, the brackets hold a resilient windshield in a flexed state so that it resiliently bears against the bracket and is secured thereby against vibrations.

In the third embodiment, either the U-shaped bendable clips or the rigid U-shaped brackets are provided for releasably holding the side edges of the windshield with the bottom edge of said windshield being secured to the fairing by two or more breakaway bolts such that upon a rider administering an impact force against the rear of the windshield, the bendable clips or the brackets supporting the side edges of the flexible windshield will release the side edges of the windshield and the breakaway bolts will separate permitting the windshield to fly away from the rider without inflicting injury to said rider.

There are no apertures, detents or openings in the windshield aligned with said U-shaped clips or U-shaped brackets, thereby eliminating the cracking of the windshield near said clips and brackets upon an impact against either the front or rear of said windshield.

Further advantageous features of the windshield assembly will be disclosed, and the foregoing advantageous features will become more apparent from the detailed description of the embodiments.

BRIEF DESCRIPTION OF THE DRAWINGS

The detailed description of the illustrative embodiments of the windshield assembly is given with reference to the several views of the drawing in which:

FIG. 3a is a sectional end view of one of the clips of the embodiment of FIG. 1 with the windshield being releasably held thereby in its operative position;

FIG. 3b is an end view similar to that of FIG. 3a, but with the windshield being partially released from the clip;

FIG. 4 is a front view of another embodiment of the windshield assembly as employed on a motorcycle fairing;

FIGS. 5a–5c illustrate the manner in which the windshield of FIG. 4 is flexed to insert it between the brackets of the embodiment of FIG. 4;

FIG. 6 is a sectional end view of one of the brackets of FIG. 4 in which the windshield is being held thereby in its operative position;

FIG. 7 is a sectional end view of the bracket similar to that of FIG. 6, but in which the windshield is partially released therefrom;

FIG. 8 is a sectional end view of the releasable holding means of another embodiment of the windshield assembly similar to the embodiment of FIGS. 4–7;

FIG. 9 is a further embodiment of the windshield assembly showing spring clips and breakaway bolts holding said assembly on the vehicle;

FIG. 10 is a cross-sectional view taken along the lines 10—10 of FIG. 9;

FIG. 11 is a sectional view of one of the clips of FIG. 9 with the windshield being releasably held in its operative position; and FIG. 12 is a sectional view similar to that of FIG. 11 only with the windshield partially released from the clip.

DETAILED DESCRIPTION OF THE EMBODIMENTS

Figure 1:
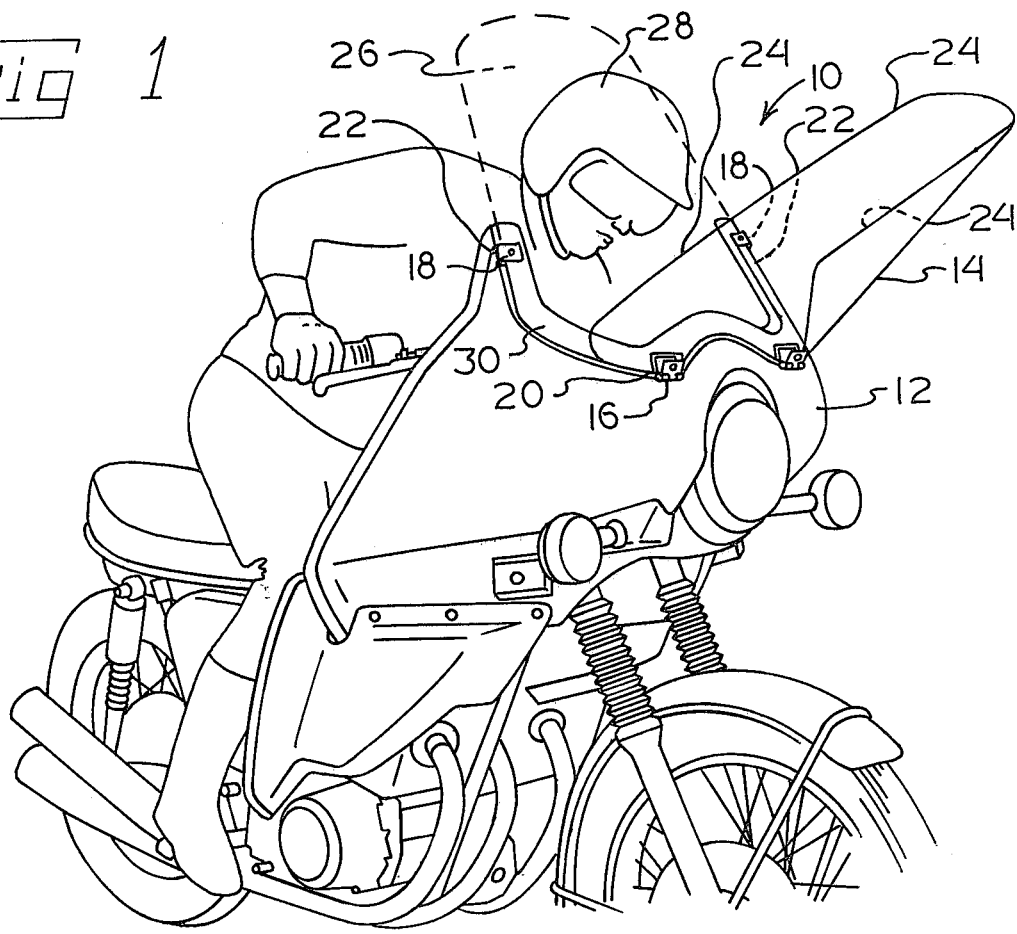
FIG. 1 is a perspective view of one embodiment of the windshield assembly as employed on a motorcycle fairing with the windshield in its operative position illustrated in broken line and the windshield in a tilted position illustrated in solid line.

Referring to FIG. 1, one embodiment 10 of the windshield assembly is seen as employed on a motorcycle fairing 12. Windshield assembly 10 includes a curved resilient windshield 14, a pair of substantially identical hinges 16 and a pair of substantially identical clips 18.

The pair of clips 18 are respectively secured to a pair of complementary upstanding arms 22 of the fairing 12, and releasably hold the windshield at opposite side edges 24 thereof in an upright or operative position, as illustrated in broken lines in FIG. 1. As will be explained, clips 18 release the hold on windshield 14 in response to an impact force at the leeward or back side 26 of the windshield. Such an impact force could be caused, for instance, by the head 28 of a motorcycle rider striking the windshield 14. In addition to restraint provided by clips 18, the windshield 14 is restrained against backward movement when in the operative position by engagement of the periphery of leeward side 26 with a recessed seat 30 extending along arms 22 and along the edge of the fairing 12 therebetween.

The hinges 16 are fixedly secured to both the windshield 14 and the motorcycle fairing 12 to hold the windshield 14 against complete separation from the fairing 12. The pivot axes of hinges 16 are in substantial alignment with one another, and the hinges are secured at the lowermost edges 20 of the windshield to allow it to move forwardly and downwardly to a pivoted position in which it is inclined downwardly and resting against the front of the fairing 12. An intermediate pivotal position of the windshield 14 is illustrated in solid line in FIG. 1.

Figure 2:
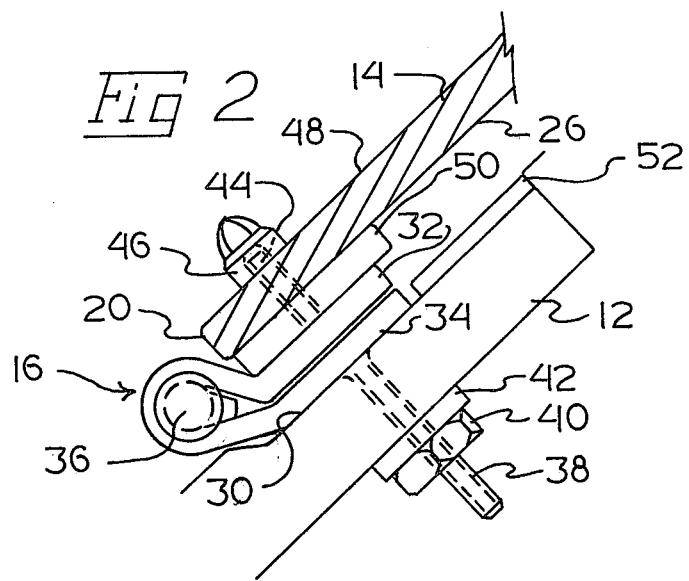
FIG. 2 is a sectional end view of one of the hinges shown in FIG. 1.

Referring to FIG. 2, each hinge 16 is seen to include a pair of plates 32 and 34, both of which are pivotally secured to a hinge pin 36 underlying the lowermost edge 20 of windshield 14. Plate 34 is nested in seat 30 and secured to body 12 by means including a threaded stud 38 secured thereto. Threaded stud 38 extends through body 12 and a nut 40 screwed onto stud 38 against washer 42 holds the plate 34 against the seat 30. Likewise, windshield 14 is secured to plate 32 by means including a threaded stud 44 secured to plate 32 and extending through a suitable hole in windshield 14. A cap nut 46 screwed onto the end of stud 44 at the front side 48 of windshield 14 prevents windshield 14 from separating from plate 32. The threaded stud 44 also extends through a washer 50 sandwiched between windshield 14 and plate 32.

The windshield 14 rests against a cushioning strip 52 of rubber-like material along the length of seat 30 spaced from hinges 16. The cushioning strip 52 provides vibration isolation between the windshield 14 and the fairing 12. It also provides an airtight seal between the windshield and seat 30 except adajcent the hinges 16 whereat the windshield 14 is spaced from the cushioning strip 52. An adhesive on the top side of cushioning strip 52 holds the windshield 14 in engagement with cushioning strip 52 to ensure an airtight seal at locations therealong in which the contour of the underside does not exactly conform to that of the seat 30 and is not pressed against the cushioning strip 52. The adhesive is not so strong as to prevent separation of the windshield 14 from the cushioning strip 52 upon impact.

Referring to FIGS. 3a and 3b, each one of clips 18 is seen to have a U-shaped body with a cross member 54, an underlying arm 56 and an overlying arm 58. Arm 56 is secured to fairing 12 by a threaded member 60 extending from the underside thereof and through a respective one of arms 22 of the fairing, a nylon washer 62 and a nut 64 screwed onto member 60 tightly against washer 62. The windshield 14 is received between arms 56 and 58 with the side edge thereof adjacent cross member 54. The separation between the overlying arm 58 and underlying arm 56 at cross member 54 is greater than the thickness of the windshield 14. The overlying arm 58 is slanted toward the underlying arm 56 and the windshield 14.

Clips 18 are resilient and made from steel. The overlying arm 58 is in a flexed state and resiliently bears against the front surface 65 of the windshield 14 and holds it against forward movement. The front surface 65 of windshield 14 has a recess 66, and a nipple 68 on the underside of overlying arm 58 is pressed into recess 66. Engagement of nipple 68 with the sides of recess 66 prevents relative lateral movement between the windshield 14 and clips 18.

Referring particularly to FIG. 3b, an impact force applied to the leeward side 26 of windshield 14 is transmitted through the windshield to the overlying arm 58.

If the force is of sufficient magnitude, the overlying arm 58 is bent at its juncture 70 with cross member 54 and pivots away from underlying arm 56 and away from the side edge of the windshield 14. The nipple 68 is moved out of recess 66, and the windshield 14, as it moves forwardly, slides along nipple 68 away from cross member 54 until completly removed from its normal underlying relationship with respect to arm 58. The inside surfaces of the clips 18 including the nipple 68 are coated with a friction-reducing material (not shown), such as Teflon, to facilitate sliding movement of the windshield therealong.

The windshield 14 is resiliently flexible, being formed from clear acrylic resin or the like. The restraint against forward movement provided by overlying arm 58 causes opposite side edges 24 of the windshield 14 to flex inwardly toward one another to minimize the extent of bending of arm 58 necessary for release of the windshield 14. The surface of the windshield at the clips 18 is slanted forwardly in a direction nonperpendicular to the direction of windshield movement. The clips 18 open in this forwardly slanted direction. This facilitates sliding movement of the windshield 14 out of clips 18 thereby to further reduce the necessary amount of bending of overlying arm 58 and to thereby further minimize damage thereto.

After release, the windshield 14 is remounted by pivoting it back to the operative position and securing it thereat with clips 18. The clips 18, bent during release of the windshield, are reused. The clips 18 are detached from the fairing 12 and arms 58 bent against the underlying arms 56. The windshield is then reinserted between arms 56 and 58 with nipple 68 within recess 66. Studs 60 are then reinserted through arms 22 and the nuts 64 tightened down thereon against washers 62.

Turning now to FIG. 4, another embodiment of the windshield assembly is seen also as employed on a motorcycle fairing 12, in which a pair of elongate brackets 72 secured to arms 18 are used in cooperation with a pair of resilient edge caps 73 overlying and secured to the opposite side edges 24 to releasably hold the windshield 14 in its upright position. The windshield 14 is secured to motorcycle fairing 12 by hinges 16 in an identical fashion as the embodiment of FIGS. 1–3b. Unlike the releasable holding means of the other embodiment, brackets 72 are rigid and are not bent by the impact force transmitted through the windshield. Rather, the flexibility characteristic of the windshield 14 is solely relied on to permit release of the windshield.

Referring to FIG. 6, each of brackets 72 is seen to have a generally U-shaped body defined by an underlying member 74 secured to an arm 22 by means of a suitable fastener 76, a curved cross member 78, and an overlying member 80 joined to the underlying member 74 through curved member 78. The resilient edge cap 73 is received between members 74 and 80 and pressed thereagainst and against the curved member 78 along the length of the bracket 72 when being held thereby. The resilient edge caps 73 provide vibration isolation between the brackets 72 and the windshield 14.

Windshield 14 is resilient and is held between brackets 72 in a flexed state, as illustrated in FIG. 5c. As seen in FIG. 5a, the straightline distance between side edge caps 73 is greater than the straightline distance between the inside surfaces of members 80 and 78 of the respective brackets 72. The windshield is inserted into engagement with brackets 72 by first forcing the side edges together such that the straightline distance therebetween is less than that between brackets 72. With the windshield in this flexed state, it is pivoted into alignment between brackets 72 and then released. The resiliency of the windshield 14 then causes the side edge caps 73 to resiliently bear against members 80 and 72, as indicated by arrows 84. Wind forces acting on the front side of the windshield 14, as illustrated by arrow 86, cause the windshield 14 to bear more tightly against members 78 and 80.

Overlying members 80 are slanted forwardly toward one another in a direction nonparallel to the windshield surface adjacent the respective side edges 24 thereof. This permits the windshield, and in particular the side edge caps 73 thereof, to slide along members 80 when an impact force is received thereby. Members 80 cam the opposite side edge caps 73 toward one another and flex the windshield toward a configuration such as shown in FIG. 5b until the side caps 73 are slid off the forwardmost ends 90 and released.

The brackets 72, as well as the clip 18, can be added to existing motorcycle fairings. If the windshield assembly is provided as original equipment by the manufacturer, members 80 and 78 and 74 can be integrally formed with the arms 22 of the fairing, as shown in FIG. 8.

FIGS. 9–12 show another embodiment of the invention wherein a windshield 114 is releasably secured to a pair of complementary upstanding arms 122 of a fairing 112 by a pair of clips 118 engaging with opposite side edges 124 of the windshield. The windshield 114 is further retained on the fairing 112 by breakaway bolts 125 passing from said fairing 112 through the lower edge portion 120 of the windshield.

More specifically, each spring clip 118, as best shown in FIGS. 11 and 12, has a U-shaped body with a cross member 154, an underlying arm 156 and an overlying arm 158. The arm 156 is secured to one arm 122 of the fairing 112 by a threaded member 160, washer 162 and nut 164. The side edges 124 of the windshield are received between the arms 156, 158 with the face 157 of the overlying arm 158 bearing against the uninterrupted surface of the windshield. The clips 118 are similar in operation to the clips 18 described above except they do not have the nipples and the windshield does have uninterrupted side edge portions without recesses, openings or apertures in the area contacted by said spring clips 118. The clips 118 rely solely on the resilience of the material of the clip to retain the side edges 124 of the windshield.

The lower edge portion 120 of the windshield is secured fairly rigidly to the fairing 112 by means of the breakaway bolts 125. As shown in FIG. 10, each bolt 125 has one end portion 127 passing through an opening 129 in the fairing and has a washer 142 and nut 140 on said end 127 of the bolt. The other end portion 131 of the bolt 125 passes through a cushion strip 152 and an opening 133 in the edge portion 120 of the windshield with a cap nut 146 threaded on said bolt 125 to clamp the edge portion 120 of the windshield against the fairing 112 with the strip 152 acting as a cushion and an airtight seal therebetween. The bolts 125 are of a plastic, soft metal, or the like material, calibrated in such a way as to permit separation of the two ends 127, 131 of the bolt 125 upon a load being applied to the bolt in excess of a predetermined amount.

From the above description of FIGS. 9–12, it can be seen that a fairing 112 is provided with spring clips 118 resiliently retaining the side edges 124 of the windshield 114 with the lower edges 120 of the windshield being releasably retained by breakaway bolts 125 such that upon an impact of predetermined intensity against the rearward surface of the windshield, the spring clips 118 will release the side edges 124 and the bolts 125 will release the lower edges 120 of the windshield and the windshield will fly free of the fairing 112. The windshield, assuming it has not sustained permanent damage in coming to rest, can be reinstalled on the fairing 112 by reassembling the side edges 124 with the spring clips 118 and by installing new breakaway bolts 125. In some types of accidents, an object with considerable force can strike the windshield from the front. With the improved mounting wherein no recesses, apertures or holes are formed in the side edges of the windshield in alignment with the spring clips 118, the windshield is not likely to crack around and in said clips 118 and, therefore, the windshield is not likely to break and fly into the rider. It is significant that by using the spring clips without recesses, apertures or holes in alignment with the spring clips, the chances of cracking the windshield under any forward or rearward blow is dramatically reduced.

It is to be understood that rigid clips or brackets 72, of the type described with respect to the FIGS. 4–8 version hereinabove, could be substituted for the spring clips 118 without departing from the spirit of the invention. The breakaway bolts 125 would work just as effectively with said brackets 72 as with the spring clips 118.

I claim:

1. The windshield assembly for a vehicle comprising:
a windshield;
means for securing one portion of the windshield to the vehicle accommodating movement of another portion of the windshield relative to the vehicle in a forward direction of vehicle travel;
means secured to the vehicle and spaced from said securing means for releasably holding the windshield in an upright position, said releasable holding means includes a member mounted to the vehicle and overlying the windshield adjacent an edge thereof to restrain the windshield against forward movement, said windshield separating from said overlying means upon receiving an impact force of selected magnitude in said forward direction; and
a portion of the impact force is transmitted through the windshield to the overlying member, and the overlying member is sufficiently flexible to bend away from the windshield in response to the impact force to release the hold thereon.

2. A windshield assembly for a vehicle comprising:
a windshield;
means for releasably securing the lower portion of the windshield to the vehicle;
said releasably securing means being bolts which are rupturable when subjected to a force in excess of a predetermined amount; and
means carried by the vehicle and spaced from said bolts for releasably holding the side edges of the windshield in an upright position, said windshield separating from said bolts and said releasably holding means upon receiving an impact force of selected magnitude in said forward direction whereby an impact on the windshield of said predetermined amount will rupture the bolts to release the lower portion of the windshield as the means for releasably holding the side edges of the windshield release said side edges.

3. A windshield assembly for a vehicle comprising:
a windshield;
means for releasably securing the lower portion of the windshield to the vehicle;
said releasably securing means for the lower portion of the windshield comprises a plurality of rupturable bolts which pass through said lower portion of the windshield and through an adjacent portion of the vehicle; and
means carried by the vehicle and spaced from said bolts for releasably holding the side edges of the windshield in an upright position, said windshield separating from said bolts and said releasably holding means upon receiving an impact force of selected magnitude in said forward direction whereby said impact force will rupture the bolts and release the lower portion of the windshield.

4. A windshield assembly for a vehicle comprising:
a windshield;
means for releasably securing the lower portion of the windshield to the vehicle;
said releasably securing means comprises at least one rupturable bolt securing the windshield to the vehicle; and
means carried by the vehicle and spaced from said at least one bolt for releasably holding the side edges of the windshield in an upright position, said windshield separating from said at least one bolt and said releasably holding means upon receiving an impact force of selected magnitude in said forward direction.

5. A windshield assembly for a vehicle as claimed in claim 4 wherein said means for releasably holding the side edges of the windshield comprises members secured to the vehicle and gripping the side edges of the windshield, said members having a continuous contact face in engagement with a continuous surface of the windshield.

6. A motorcycle fairing comprising:
a fairing body having a top edge;
a windshield with a bottom edge; and
means for mounting the windshield to the body including
a member spaced from the top edge and secured to the body, said member overlying an uninterrupted side edge portion of the windshield and releasably holding said windshield to the body, and
means for releasably securing the bottom edge of the windshield to the top edge of the body, said means including at least one rupturable bolt extending through said windshield and through said top edge of the body,
said member having a portion movable away from the body in response to a force of predetermined magnitude transmitted thereto through the windshield to release the hold thereon, whereby said windshield separates from said body upon release of said member and upon release of said securing means.

7. A motorcycle fairing comprising:
a fairing body having a top edge and a pair of spaced arms extending upwardly therefrom,
a windshield with a bottom edge; and
means for mounting the windshield to the body including
a member spaced from the top edge and secured to the body, said member overlying an uninterrupted side edge portion of the windshield and releasably holding it to the body, and rupturable means for releasably securing the windshield to the body adjacent the bottom edge thereof, said member having a portion movable away from the body in response to a force of predetermined magnitude transmitted thereto through the windshield to release the hold thereon, said windshield separating from said body upon release of said portion of said member and upon release of said rupturable means.

8. A motorcycle fairing comprising:

a fairing body having a top edge portion and a pair of spaced arms extending upwardly therefrom;

a windshield with a bottom edge portion and spaced side edge portions; and means for mounting the windshield to the fairing body including a spring clip carried by each arm and spaced from the top edge portion of the body, said spring clips having a portion overlying uninterrupted side edge portions of the windshield and releasably holding said windshield to the body, and at least one rupturable bolt extending through said bottom edge portion of said windshield and through said top edge portion of the fairing body, said overlying portions of said spring clips are movable away from the body in response to a force of predetermined magnitude transmitted thereto through the windshield to release the hold thereon, whereby said windshield separates from said body upon release of said spring clips and upon release of said at least one rupturable bolt.

9. A motorcycle fairing as claimed in claim 8 wherein a plurality of rupturable bolts extend through said bottom edge portion of the windshield and through said top edge portion of the fairing body.

10. A motorcycle fairing as claimed in claim 8 wherein each of said spring clips has a U-shaped body defined by said overlying portion and by an underlying portion, said overlying portion and said underlying portion are joined by a cross member, and said windshield is received between said portions with its edge adjacent the cross member.

11. A motorcycle fairing as claimed in claim 10 wherein the underlying portions of said spring clips include means for fastening it to the arms of the fairing body.

12. A motorcycle fairing as claimed in claim 10 wherein the overlying portion, the underlying portion and the cross member are integrally formed with one another.

13. A windshield assembly for a vehicle comprising:

a windshield with a bottom edge and spaced side edges; and means for mounting the windshield to the vehicle including a spring clip carried by the vehicle and having a portion overlying an uninterrupted side edge portion of the windshield and releasably holding it to the vehicle, and rupturable bolts for releasably securing the windshield to the vehicle adjacent the bottom edge of the windshield, said spring clip having said overlying portion movable away from the vehicle in response to a force of predetermined magnitude transmitted thereto through the windshield to release the hold of the spring clip on the windshield, said windshield separating from said vehicle upon release of said overlying portion of said spring clip and upon release of said rupturable bolts.

* * * * *